(12) United States Patent
Oblizajek et al.

(10) Patent No.: US 10,337,961 B2
(45) Date of Patent: Jul. 2, 2019

(54) METHOD OF ANALYZING RADIAL FORCE VARIATION IN A TIRE/WHEEL ASSEMBLY

(71) Applicant: GM GLOBAL TECHNOLOGY OPERATIONS LLC, Detroit, MI (US)

(72) Inventors: Kenneth L. Oblizajek, Troy, MI (US); John D. Sopoci, Commerce Township, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 145 days.

(21) Appl. No.: 15/499,016

(22) Filed: Apr. 27, 2017

(65) Prior Publication Data

US 2018/0313723 A1    Nov. 1, 2018

(51) Int. Cl.
*G01M 17/02*    (2006.01)

(52) U.S. Cl.
CPC ............................... *G01M 17/021* (2013.01)

(58) Field of Classification Search
CPC ... G01M 17/02; G01M 17/013; G01M 17/021
See application file for complete search history.

(56) References Cited

U.S. PATENT DOCUMENTS

| 6,651,716 B1 * | 11/2003 | Brown | B29D 30/0633 |
| | | | 152/564 |
| 2013/0073224 A1 * | 3/2013 | Oblizajek | G01M 17/02 |
| | | | 702/41 |
| 2013/0098148 A1 * | 4/2013 | Mawby | G01M 17/02 |
| | | | 73/146 |
| 2013/0298657 A1 * | 11/2013 | Stanoszek | G01M 17/022 |
| | | | 73/146 |
| 2017/0057283 A1 * | 3/2017 | Staab | B60B 29/001 |
| 2017/0102293 A1 * | 4/2017 | Singh | G01M 17/02 |
| 2017/0153163 A1 * | 6/2017 | Okada | G01M 17/022 |
| 2017/0160079 A1 * | 6/2017 | Takebuchi | G01B 11/24 |
| 2017/0176295 A1 * | 6/2017 | Fukuda | B60C 19/00 |
| 2017/0234677 A1 * | 8/2017 | Little | G01B 11/02 |
| | | | 348/86 |
| 2017/0234774 A1 * | 8/2017 | Fujiwara | B60C 25/007 |
| | | | 73/146 |
| 2017/0241869 A1 * | 8/2017 | Mawby | G01M 17/02 |
| 2018/0207893 A1 * | 7/2018 | Appleman | G01M 17/02 |

* cited by examiner

*Primary Examiner* — Mohamed Charioui
*Assistant Examiner* — Catherine T. Rastovski
(74) *Attorney, Agent, or Firm* — Quinn IP Law

(57) ABSTRACT

A method of controlling a assembly includes measuring a first amplitude of a selected harmonic order of the radial force variation of the assembly, and locating a first angular location of the selected order of the radial force variation of the assembly. A second angular location of a tire is located, which indicates a phase of the selected order of a radial force variation of the tire, having a second amplitude. A third angular location of a wheel is located, which indicates a phase of the selected order of a runout value of the wheel, and has a third amplitude. A remaining force metric may be calculated using the pairs of the first amplitude and the first angular location, the second amplitude and the second angular location, and the third amplitude and the third angular location.

20 Claims, 4 Drawing Sheets

METHOD OF ANALYZING RADIAL FORCE VARIATION IN A TIRE/WHEEL ASSEMBLY

INTRODUCTION

The disclosure generally relates to a method of controlling a radial force variation of a tire/wheel assembly, and a radial force variation machine for sensing the radial force variation of the tire/wheel assembly.

Due to manufacturing tolerances, variations in material properties and other factors, tires may provide a different radial force at different angular locations on the tire, often referred to as a radial force variation of the tire. Tires exhibiting a radial force variation may have the location of the highest amplitude of the radial force variation marked with an identifier, such as a sticker or other type of marking. Similarly, due to manufacturing tolerances, wheels may include a radial distance variation from a center, referred to as runout. Wheels may have the location of the lowest value of the runout marked within an identifier, such as a sticker or other type of marking. Some manufacturers' will "match-mount" the tires and wheels, in which the high point of the radial force variation on the tire is angularly aligned with the low point of the runout on the wheel, to minimize radial force variation in the tire/wheel assembly.

While the magnitude and location of the force variation of the tire and the magnitude and location of the runout of the wheel are significant contributors to the overall radial force variation of the tire/wheel assembly, there are other factors that contribute to the overall radial force variation of the tire/wheel assembly, which are not attributable to the location and magnitude of the highest radial force variation of the tire, or to the location and magnitude of the runout of the wheel.

SUMMARY

A method of controlling a variation of a radial force of a tire/wheel assembly for use in a vehicle is provided. The method includes selecting a harmonic order of the assembly. A first amplitude of the selected harmonic order of the variation of the radial force of the tire/wheel assembly is measured, with a radial force variation machine. A first angular location of the selected harmonic order of the variation of the radial force of the tire/wheel assembly is located with the radial force variation machine. A second angular location is located. The second angular location is an angular location of a tire of the tire/wheel assembly. The second angular location indicates a phase of the selected harmonic order of a radial force variation of the tire, having a second amplitude of the selected harmonic order. A third angular location is located. The third angular location is an angular location of a wheel runout factor of a wheel of the tire/wheel assembly. The third angular location indicates a phase of the selected harmonic order of the wheel runout factor, and has a third amplitude of the selected harmonic order. At least one of remaining force metric, or a sum of a tire force metric and a wheel force metric are calculated. The remaining force metric, and the sum of the tire force metric and the wheel force metric are calculated using at least two of the pairs of the first amplitude and the first angular location, the second amplitude and the second angular location, and the third amplitude and the third angular location.

In one embodiment of the method of controlling the radial force variation of the tire/wheel assembly, the wheel runout factor includes at least one of an inboard rim runout, an outboard rim runout, an average of the inboard rim runout and the outboard rim runout, or a transformed combination of the inboard rim runout and the outboard rim runout.

In one aspect of the method of controlling the radial force variation of the tire/wheel assembly, the first angular location and the first amplitude are combined to define a tire/wheel assembly phasor, the second angular location and the second amplitude are combined to define a tire phasor, and the third angular location and the third amplitude are combined to define a wheel phasor. A tire transfer function coefficient may be applied to the tire phasor to define the tire force metric. Similarly, a wheel transfer function coefficient may be applied to the wheel phasor to define the wheel force metric.

In one embodiment of the method of controlling the radial force variation of the tire/wheel assembly, a plurality of tire/wheel assemblies is selected, and a tire transfer function coefficient and a wheel transfer function coefficient are calculated from an aggregated combination of the tire/wheel assembly phasors, the tire phasors, and the wheel phasors of the plurality of tire/wheel assemblies. The tire transfer function coefficient and the wheel transfer function coefficient may be calculated with a transfer function analysis using multiple inputs and a single output model.

In one aspect of the method of controlling the radial force variation of the tire/wheel assembly, the remaining force metric is calculated by a difference between the tire/wheel assembly phasor and the sum of the tire force metric and the wheel force metric. The remaining force metric includes an amplitude and a phase angle of the selected harmonic order of a portion of the tire/wheel assembly phasor that is not attributable to the tire force metric and the wheel force metric.

In one embodiment of the method of controlling the radial force variation of the tire/wheel assembly, the selected harmonic order of the assembly may be a first harmonic order of the tire/wheel assembly.

In one embodiment of the method of controlling the radial force variation of the tire/wheel assembly, the tire is mounted onto the wheel to form the tire/wheel assembly. The tire and the wheel are randomly mounted, and are not match mounted.

In another embodiment of the method of controlling the radial force variation of the tire/wheel assembly, the tire is mounted onto the wheel to form the tire/wheel assembly, with the tire and the wheel being match mounted in a specific positional relationship relative to each.

In one aspect of the method of controlling the radial force variation of the tire/wheel assembly, a plan view image of the tire/wheel assembly is created, with the radial force variation machine, such that at least one of the first angular location, the second angular location, or the third angular location is identifiable in the plan view image. The plan view image of the tire/wheel assembly may be created when the location of the at least one of the first angular location, the second angular location, or the third angular location is angularly aligned with a reference.

In one embodiment of the method of controlling the radial force variation of the tire/wheel assembly, the wheel runout factor includes a plurality of sub-factors, with each respective one of the plurality of sub-factors indicating a phase of the selected harmonic order of the respective one of the sub-factors, and having a respective amplitude. The wheel phasor includes a sub-factor phasor for each respective one of the plurality of sub-factors of the wheel runout factor. Each of the respective sub-factor phasors has an angular location of the selected harmonic order of the respective sub-factor, and an amplitude of the selected harmonic order of the respective sub-factor. The wheel transfer function coefficient includes a sub-factor transfer coefficient for each respective one of the plurality of sub-factor phasors of the wheel phasor. The wheel force metric includes a sub-factor force metric for each respective one of the plurality of sub-factor phasors. The plurality of sub-factors of the wheel runout factor includes at least two of the inboard rim runout, the outboard rim runout, the average of the inboard rim runout and the outboard rim runout, and the transformed combination of the inboard rim runout and the outboard rim runout.

An alternative method of controlling a radial force variation of a tire/wheel assembly is also provided. The method includes A) defining a tire/wheel assembly phasor, B) defining a tire phasor, and C) defining a wheel phasor. The tire/wheel assembly phasor includes a first angular location of a selected harmonic order of the variation of the radial force of the tire/wheel assembly, and a first amplitude of the selected harmonic order of the variation of the radial force of the tire/wheel assembly. The tire phasor includes a second angular location of a tire of the tire/wheel assembly. The second angular location indicates a phase of the selected harmonic order of a radial force variation of the tire, and a second amplitude of the selected harmonic order of the radial force variation of the tire. The wheel phasor includes a third angular location of a wheel runout factor of a wheel of the tire/wheel assembly. The third angular location indicates a phase of the selected harmonic order of the wheel runout factor, and has a third amplitude of the selected harmonic order of the wheel runout factor of the wheel. A tire transfer function coefficient is multiplied with the tire phasor to define a tire force metric. A wheel transfer function coefficient is multiplied with the wheel phasor to define a wheel force metric. A sum of the tire force metric and the wheel force metric is calculated to define a combined wheel and tire force metric. A difference between the tire/wheel assembly phasor and the combined wheel and tire force metric is calculated to define a remaining force metric. The remaining force metric includes an amplitude and a phase angle of the selected harmonic order of a portion of the tire/wheel assembly phasor that is not attributable to the tire force metric and the wheel force metric.

In one embodiment of the alternative method of controlling the radial force variation of the tire/wheel assembly, the wheel runout factor includes at least one of an inboard rim runout, an outboard rim runout, an average of the inboard rim runout and the outboard rim runout, or a transformed combination of the inboard rim runout and the outboard rim runout.

In one embodiment of the alternative method of controlling the radial force variation of the tire/wheel assembly, steps A, B, and C are each repeated for a plurality of different tire/wheel assemblies, in order to provide a data set in which each of the plurality of tire/wheel assemblies provides a respective tire/wheel assembly phasor, a respective tire phasor, and a respective wheel phasor. The tire transfer function coefficient and the wheel transfer function coefficient are then calculated from an aggregated combination of the tire/wheel assembly phasors, the tire phasors, and the wheel phasors of the plurality of tire/wheel assemblies. The tire transfer function coefficient and the wheel transfer function coefficient may be calculated using the data set of the plurality of tire/wheel assemblies with a transfer function analysis using multiple inputs and a single output model.

In one embodiment of the alternative method of controlling the radial force variation of the tire/wheel assembly, the wheel runout factor includes a plurality of sub-factors, with each respective one of the plurality of sub-factors indicating a phase of the selected harmonic order of the respective one of the sub-factors, and having a respective amplitude. The wheel phasor includes a sub-factor phasor for each respective one of the plurality of sub-factors of the wheel runout factor. Each of the respective sub-factor phasors has an angular location of the selected harmonic order of the respective sub-factor, and an amplitude of the selected harmonic order of the respective sub-factor. The wheel transfer function coefficient includes a sub-factor transfer coefficient for each respective one of the plurality of sub-factor phasors of the wheel phasor. The wheel force metric includes a sub-factor force metric for each respective one of the plurality of sub-factor phasors. The plurality of sub-factors of the wheel runout factor includes at least two of the inboard rim runout, the outboard rim runout, the average of the inboard rim runout and the outboard rim runout, and the transformed combination of the inboard rim runout and the outboard rim runout.

A radial force variation machine for measuring a radial force variation in a tire/wheel assembly is also provided. The radial force variation machine includes a spinner that is rotatable about a rotation axis. The spinner is configured for supporting the tire/wheel assembly. A load impressing mechanism is operable to contact and load the tire/wheel assembly to a fixed separation between the rotation axis and the load impressing mechanism. A radial force sensor is positioned relative to the spinner and the load impressing mechanism. The radial force sensor is operable to sense a change in amplitude of a radial force of the tire/wheel assembly for each revolution of the tire/wheel assembly as the tire/wheel assembly rotates about the rotation axis. A locating system is operable to identify an angular location on the tire/wheel assembly of a phase of a selected harmonic order of the radial force of the tire/wheel assembly. The locating system is also operable to locate an angular location on the tire/wheel assembly of a phase of the selected harmonic order of a radial force of a tire of the tire/wheel assembly, and an angular location on the tire/wheel assembly of a phase of the selected harmonic order of a wheel runout factor of a wheel of the tire/wheel assembly.

In one embodiment of the radial force variation machine, the locating system includes a camera positioned to capture a plan view image of the tire/wheel assembly. The image is captured such that the angular location on the tire/wheel assembly of the phase of the selected harmonic order of the radial force of the tire, and the angular location on the tire/wheel assembly of the phase of the selected harmonic order of the wheel runout factor of the wheel are identifiable in the plan view image.

In one embodiment, the camera may be synchronized with the radial force sensor to capture the plan view image of the tire/wheel assembly, thereby creating a normative axis basis for the relative angular locations of the angular location on the tire/wheel assembly of the phase of the selected harmonic order of the radial force of the tire, and the angular location on the tire/wheel assembly of the phase of the selected harmonic order of the wheel runout factor of the wheel.

Accordingly, the remaining force metric, and the sum of the tire force metric and the wheel force metric, which are derived from the method of controlling the radial force variation of the tire/wheel assembly described herein, are useful analytics that may be examined via statistical analysis or individual component diagnostics to quantify factors affecting the radial force variation of the tire/wheel assembly. The statistical analysis or individual component diagnostics may be used during assembly of similar tires and wheels for prototypical or production runs to reduce the radial force variation. The radial force variation machine described herein may be used to provide the initial data required to calculate the remaining force metric, and the sum of the tire force metric and the wheel force metric.

The above features and advantages and other features and advantages of the present teachings are readily apparent from the following detailed description of the best modes for carrying out the teachings when taken in connection with the accompanying drawings.

DETAILED DESCRIPTION

Figure 1:
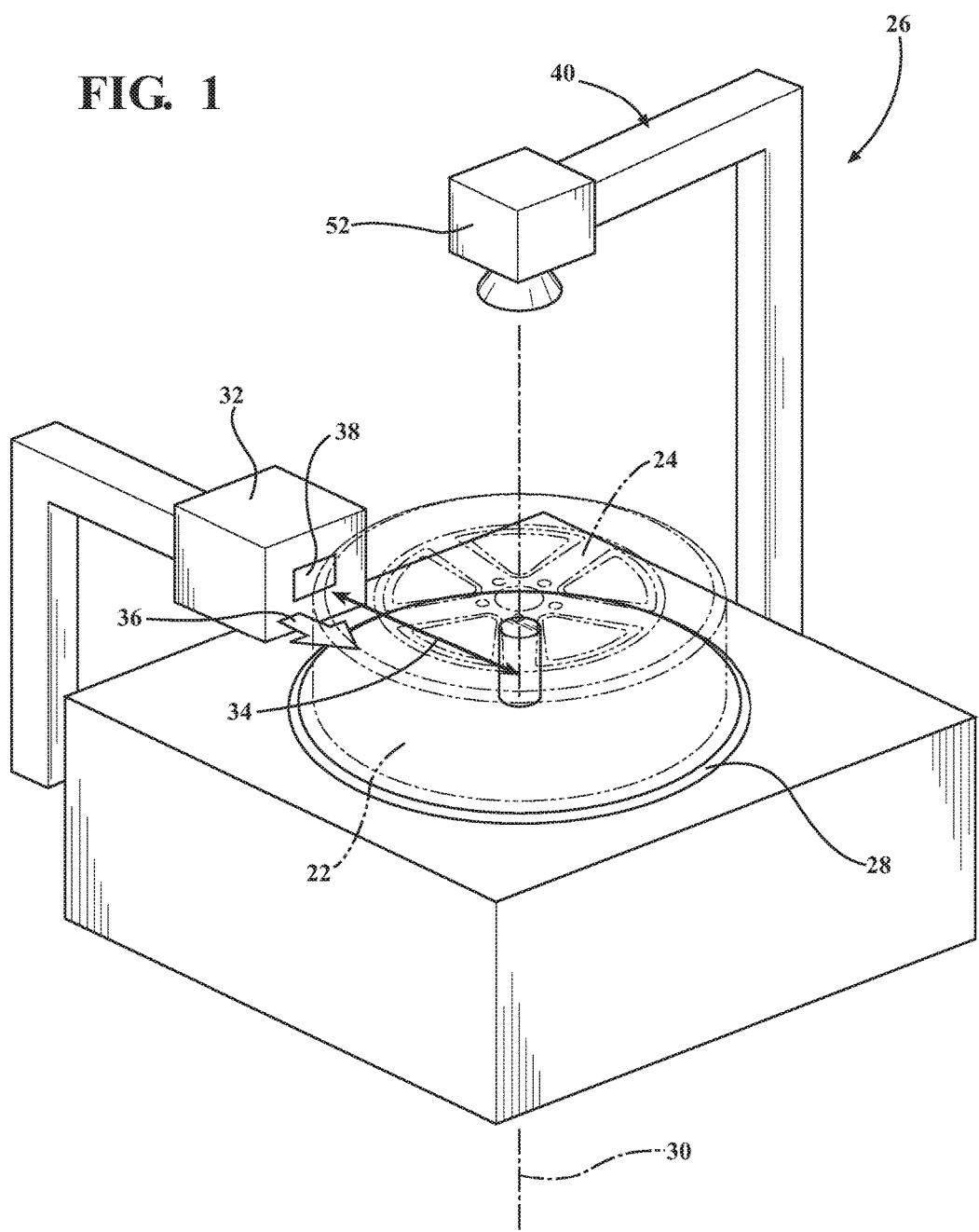
FIG. 1 is a schematic plan view of a radial force variation machine.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Referring to the FIGURES, wherein like numerals indicate like parts throughout the several views, a method of controlling a variation of a radial force 43 of a tire/wheel assembly 20 is described in greater detail below. The tire/wheel assembly 20 includes a tire 22, which is mounted onto a wheel 24, in the usual manner. The method may use a radial force variation machine 26 for measuring the variation in the radial force 43 of the tire/wheel assembly 20. An exemplary embodiment of the radial force variation machine 26 is described below and shown in FIG. 1. The exemplary embodiment of the radial force variation machine 26 may be used to generate the data required for the method of controlling the variation of the radial force 43 of the tire/wheel assembly 20. However, it should be appreciated that the radial force variation machine 26 may differ from the exemplary embodiment described herein. Furthermore, it should be appreciated that other methods may be used to generate the data required for the method of controlling the variation in the radial force 43 of the tire/wheel assembly 20.

Referring to FIG. 1, the radial force variation machine 26 includes a spinner 28. The spinner 28 is rotatable about a rotation axis 30, and is configured for supporting the tire/wheel assembly 20. The spinner 28 may include a device that is capable of supporting the tire/wheel assembly 20 and rotating the tire/wheel assembly 20 about the rotation axis 30. For example, the spinner 28 may include, but is not limited to, an electric motor coupled to a turntable, and may further include hardware suitable for mounting the tire/wheel assembly 20 to the turntable. The electric motor may be engaged to rotate the turntable about the rotation axis 30. The hardware securely connects the tire/wheel assembly 20 to the turntable. The tire/wheel assembly 20 is mounted to the spinner 28 with a central axis of the tire/wheel assembly 20 coaxially located with the rotation axis 30. The specific type, style, location, construction, and operation of the spinner 28 are not pertinent to the teachings of the disclosure, and are therefore not described in detail herein.

A load impressing mechanism 32 is positioned to engage an outer circumferential surface of the tire 22 of the tire/wheel assembly 20. The load impressing mechanism 32 is operable to contact and load the tire/wheel assembly 20 with a compressive force 36 directed inward toward the rotation axis 30 to define a fixed separation distance 34 between the outer circumferential surface of the tire 22 and the rotation axis 30 at the point of loading. The load impressing mechanism 32 contacts the tire 22 along a small section of the circumference of the tire 22. The load impressing mechanism 32 does not contact or surround the entire circumference of the tire 22. Accordingly, the load impressing mechanism 32 applies the compressive force 36 to a section of the tire 22. As such, when the tire/wheel assembly 20 is loaded by the load impressing mechanism 32, the load impressing mechanism 32 confines the tire/wheel assembly 20, at the location of the compressive force 36, to the fixed separation distance 34 between the load impressing mechanism 32 and the rotation axis 30. By so doing, the radial force 43 (shown in FIG. 2) is generated in the tire/wheel assembly 20. The load impressing mechanism 32 may include a device that is capable of applying the compressive force 36 to a location on the outer circumferential surface of the tire 22 as the tire 22 is rotated about the rotation axis 30. For example, the load impressing mechanism 32 may include, but is not limited to, a linear actuator or other similar device capable of moving a roller toward and/or away from the rotation axis 30 for engagement with the tire 22 of the tire/wheel assembly 20. The specific type, style, location, construction, and operation of the load impressing mechanism 32 are not pertinent to the teachings of the disclosure, and are therefore not described in detail herein.

A radial force sensor 38 is positioned relative to the spinner 28 and the load impressing mechanism 32. The radial force sensor 38 is operable to sense a change in amplitude of the radial force 43 of the tire/wheel assembly 20 for each revolution of the tire/wheel assembly 20, as the tire/wheel assembly 20 rotates about the rotation axis 30. It should be appreciated that when the load impressing mechanism 32 applies the compressive force 36 to the tire/wheel assembly 20 to establish the fixed separation distance 34 between the load impressing mechanism 32 and the rotation axis 30, the tire/wheel assembly 20 generates the reactionary radial force 43. Due to manufacturing variations in the tire 22 and the wheel 24 of the tire/wheel assembly 20, along with other variables, the radial force 43 of the tire/wheel assembly 20 varies as the tire/wheel assembly 20 rotates. When the tire/wheel assembly 20 is rotated about the rotation axis 30, the radial force sensor 38 senses the change in the amplitude or magnitude of the radial force 43 in the tire/wheel assembly 20 throughout a rotational cycle of the tire/wheel assembly 20. The radial force sensor 38 may include a type and/or style of sensor capable of sensing a change in an applied load. Furthermore, it should be appreciated that the radial force sensor 38 may be incorporated into the load impressing mechanism 32. The specific type, style, location, construction and operation of the radial force sensor 38 is not pertinent to the teachings of this disclosure, and are therefore not described in detail herein.

Figure 2:
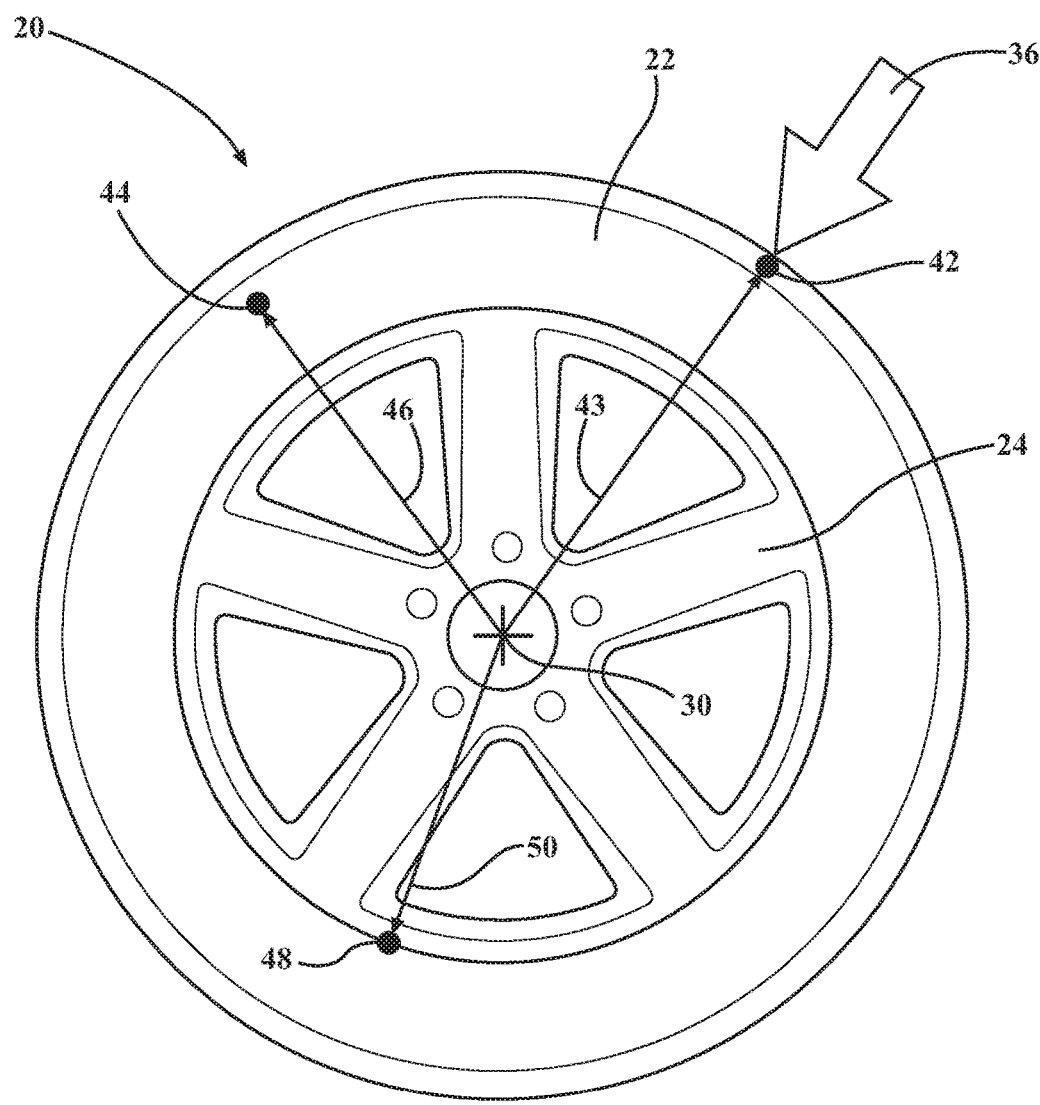
FIG. 2 is a schematic plan view of a tire/wheel assembly.

The radial force variation machine 26 further includes a locating system 40. Referring to FIG. 2, the locating system 40 is operable to identify a first angular location 42 on the tire/wheel assembly 20 of a phase of a selected harmonic order of the radial force 43 of the tire/wheel assembly 20, a second angular location 44 on the tire/wheel assembly 20 of a phase of the selected harmonic order of a radial force 46 of a tire 22 of the tire/wheel assembly 20, and a third angular location 48 on the tire/wheel assembly 20 of a phase of the selected harmonic order of a wheel runout factor 50 of a wheel 24 of the tire/wheel assembly 20. In other words, the locating system 40 is operable to locate a location or position on the tire/wheel assembly 20 for a particular phase of a harmonic order of the variation of the radial force 43 of the tire/wheel assembly 20, as well as a location or position on the tire 22 of the tire/wheel assembly 20 for a particular phase of a harmonic order of the variation of the radial force 46 of the tire 22, and a location or position on the wheel 24 of the tire/wheel assembly 20 for a particular phase of a harmonic order of the wheel runout factor 50 of the wheel 24.

It should be appreciated that each full revolution of the tire/wheel assembly 20 about the rotation axis 30 defines a cycle. Because the radial force 43 of the tire/wheel assembly 20 varies as the tire/wheel assembly 20 rotates about the rotation axis 30, each cycle will define a waveform. The phase may be defined as the position on the waveform at a particular instant in time. The harmonic order may be defined as the number of times the waveform repeats itself during each cycle. Accordingly, a first order harmonic will occur once every cycle, whereas a second order harmonic will occur twice every cycle.

The locating system 40 may locate the first angular location 42, the second angular location 44, and the third angular location 48 in a suitable manner capable of relating these angular positions relative to each other or some other reference., in order to provide a normative axis basis for the relative angular locations of the first angular location 42, the second angular location 44, and the third angular location 48. For example, in the exemplary embodiment shown in FIG. 1, and described herein, the locating system 40 includes a camera 52 positioned to capture a plan view image of the tire/wheel assembly 20. The plan view image of the tire/wheel assembly 20 is shown in FIG. 2. The plan view image is captured such that the second angular location 44, i.e., the angular location on the tire/wheel assembly 20 of the phase of the selected harmonic order of the radial force 46 of the tire 22, and the third angular location 48, i.e., the angular location on the tire/wheel assembly 20 of the phase of the selected harmonic order of the wheel runout factor 50 of the wheel 24, are identifiable in the plan view image relative to the first angular location 42, i.e., the angular location on the tire/wheel assembly 20 of a phase of a selected harmonic order of the radial force 43 of the tire/wheel assembly 20.

For example, the camera 52 may be synchronized with the radial force sensor 38 to capture the plan view image of the tire/wheel assembly 20 at the instant the radial force sensor 38 senses the desired phase of the selected harmonic order of the variation of the radial force 43 of the tire/wheel assembly 20. By capturing the plan view image at the instant the radial force sensor 38 senses the desired phase of the selected order of the variation of the radial force 43 of the tire/wheel assembly 20, i.e., the first angular location 42, the second angular location 44 and the third angular location 48 may be determined relative to the first angular location 42, thereby creating the normative axis basis for the relative angular locations on the tire/wheel assembly 20 of the phase of the selected harmonic order of the radial force 46 of the tire 22, and the angular location on the tire/wheel assembly 20 of the phase of the selected harmonic order of the wheel runout factor 50 of the wheel 24. It should be appreciated that the locating system 40 may include some other system not described or shown herein, that is capable of identifying the location of the first angular location 42, the second angular location 44, and the third angular location 48 relative to each other, and that the locating system 40 described herein is provided merely as an exemplary embodiment of one possible locating system 40.

The method of controlling the variation of the radial force 43 of the tire/wheel assembly 20, described in greater detail below, uses the radial force variation machine 26 described above to identify the relative locations of the first angular location 42, the second angular location 44, and the third angular location 48. However, it should be appreciated that the first angular location 42, the second angular location 44, and the third angular location 48 may be obtained with some other machine and in some other manner, and that the radial force variation machine 26 is not required for the implementation of the method of controlling the variation of the radial force 43 of the tire/wheel assembly 20.

Figure 3:
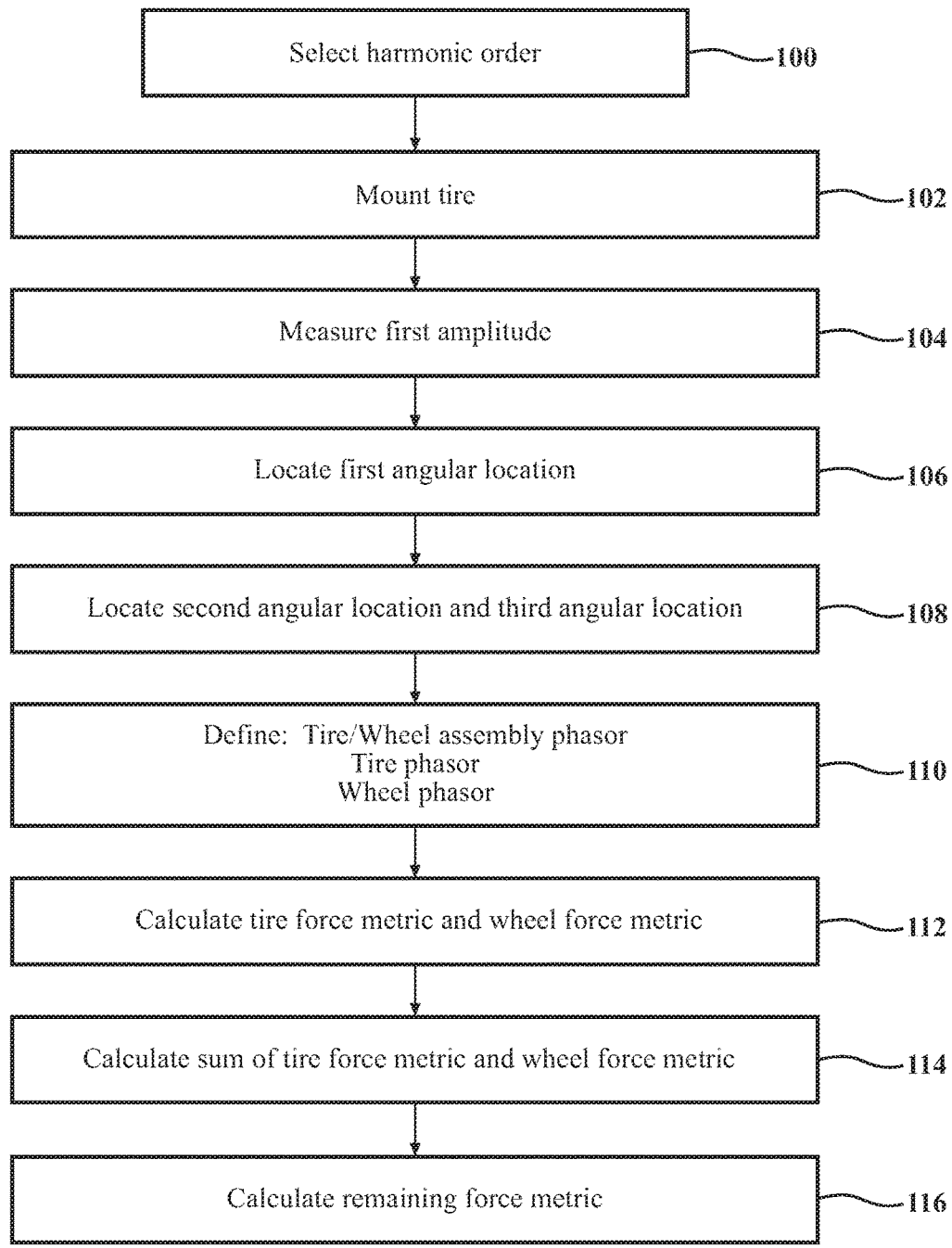
FIG. 3 is a flowchart representing a method of controlling a variation of a radial force of the tire/wheel assembly.

Referring to FIG. 3, the method includes selecting a harmonic order of the tire/wheel assembly 20 to be analyzed. The step of selecting the harmonic order is generally indicated by box 100 in FIG. 3. As noted above, the harmonic order may be defined as the number of times a waveform repeats itself during each cycle. Accordingly, a first harmonic order of the tire/wheel assembly 20 occurs once every full rotation of the tire/wheel assembly 20, a second harmonic order of the tire/wheel assembly 20 occurs twice every full rotation of the tire/wheel assembly 20, and so on. The desired harmonic order may include any harmonic order. In the exemplary embodiment described herein, the desired or selected harmonic order is the first harmonic order of the tire/wheel assembly 20. As such, in the exemplary embodiment of the process described herein, the method may be used to analyze the variation of the radial force 43 of the tire/wheel assembly 20 that occurs once every rotation of the tire/wheel assembly 20, i.e., the first harmonic order. However, it should be appreciated that the process may be used with a different harmonic order, such as a second harmonic order, a third harmonic order, etc.

The method includes mounting the tire 22 on the wheel 24 to form the tire/wheel assembly 20. The step of mounting the tire 22 on the wheel 24 is generally indicated by box 102 in FIG. 3. The tire 22 may be randomly mounted onto the wheel 24. As such, the tire 22 and the wheel 24 may not be "match mounted" as appreciated by those skilled in the art. As used herein, the term "match mounted" may be defined as mounting the tire 22 onto the wheel 24 such that a location of a highest value of the radial force 46 of the tire 22 is aligned with a lowest value of the wheel runout factor 50 of the wheel 24, so as to offset each other. Accordingly, the tire 22 may be mounted onto the wheel 24 without regard for the relative location between the highest variation of the radial force 46 of the tire 22 and the lowest runout of the wheel 24. However, in other embodiments, the tire 22 and the wheel 24 may be match mounted in a specific positional relationship relative to each other, e.g., the tire 22 may be mounted onto the wheel 24 such that the location of the highest value of the radial force 46 of the tire 22 is aligned with the lowest value of the wheel runout factor 50 of the wheel 24.

A first amplitude of the selected harmonic order of the variation of the radial force 43 of the tire/wheel assembly 20 may then be measured or otherwise determined. The step of measuring the first amplitude is generally indicated by box 104 in FIG. 3. The first amplitude may be measured in a suitable manner. For example, the radial force variation machine 26 described above may be used to measure the first amplitude of the selected harmonic order of the variation of the radial force 43 of the tire/wheel assembly 20. Using the radial force variation machine 26, the radial force sensor 38 measures the radial force 43 of the tire/wheel assembly 20 as the tire/wheel assembly 20 rotates about the rotation axis 30. The first angular location 42 of the selected harmonic order of the variation of the radial force 43 of the tire/wheel assembly 20 is also located on the tire/wheel assembly 20. The step of locating the first angular location 42 is generally indicated by box 106 in FIG. 3. The first angular location 42 may be located in a suitable manner. For example, the radial force variation machine 26 described above may be used to locate the first angular location 42. As described above, the locating system 40 of the radial force variation machine 26 may locate the first angular location 42 relative to the first amplitude of the selected order of the variation of the radial force 43 of the tire/wheel assembly 20. For example, if the first amplitude is defined as a maximum or highest value of the variation of the radial force 43 of the selected order of the tire/wheel assembly 20, then the first angular location 42 would be the angular location on the tire/wheel assembly 20 at which the first amplitude occurs. As noted above, in the exemplary embodiment described herein, the desired or selected harmonic order is the first harmonic order of the tire/wheel assembly 20. Accordingly, the first amplitude of the selected harmonic order and the first angular location 42 of the selected harmonic order are at a first harmonic order of the tire/wheel assembly 20.

As noted above, the process described herein uses the radial force variation machine 26 to generate the data required for the disclosed process. Accordingly, the radial force variation machine 26 is used to create a plan view image of the tire/wheel assembly 20, such that the second angular location 44, and the third angular location 48 are identifiable in the plan view image. In one exemplary embodiment, the plan view image of the tire/wheel assembly 20 is created when the location of the first angular location 42 is angularly aligned with a reference, so that the second angular location 44 and the third angular location 48 may be located relative to the first angular location 42. The reference may include, but is not limited to, a defined mark or existing location on the radial force variation machine 26, or alternatively, a strobe light that flashes, an actuation of a camera shutter, or equivalent thereof in capturing the image. Accordingly, if the plan view image is captured when the first angular location 42 is aligned with the reference, the first angular location 42 on the tire/wheel assembly 20 may be identified by the location of the tire/wheel assembly 20 relative to the reference at the instant the plan view image is captured, and the second angular location 44 and the third angular location 48 may be located or identified relative to the first angular location 42.

The second angular location 44 and the third angular location 48 are also located. The step of locating the second angular location 44 and the third angular location 48 relative to the first angular location 42 is generally indicated by box 108 in FIG. 3. As noted above, the second angular location 44 is the angular location of the tire 22 of the tire/wheel assembly 20 indicating the phase of the selected harmonic order of the radial force 46 variation of the tire 22, and has a second amplitude of the selected harmonic order. The radial force variation machine 26 may be used to locate the second angular location 44. For example, tire 22 manufacturers often place an identifier at a location on the tire 22 of a highest variation of the radial force 46 of the tire 22, sometimes referred to as a "hi" mark. The amplitude for the hi mark, i.e., the highest variation of the radial force 46 of the tire 22, is also generally available from the tire 22 manufacturer. In the event that the tire 22 is not marked with the hi mark and/or the amplitude of the hi mark is not known, then the location of the hi mark and the amplitude of the hi mark may be obtained and/or sensed in a suitable manner, and the hi mark placed on the tire 22. With the hi mark on the tire 22, and identifiable in the captured plan view image of the tire/wheel assembly 20, the angular position of the hi mark relative to the first angular location 42 may be determined, and defined as the second angular location 44. The amplitude of the second angular location 44 may be defined as the amplitude of the hi mark, i.e., the amplitude of the highest variation of the radial force 46 of the tire 22. While the process is described herein using the hi mark to identify or locate the second angular location 44 and the second amplitude, it should be appreciated that the second angular location 44 and the second amplitude may be located and/or determined in some other manner not shown or described herein.

As noted above, the third angular location 48 is the angular location of the wheel runout factor 50 of the wheel 24 of the tire/wheel assembly 20 indicating the phase of the selected harmonic order of the wheel runout factor 50, and has a third amplitude of the selected harmonic order. The radial force variation machine 26 may be used to locate the third angular location 48. For example, wheel 24 manufacturers often place an identifier at a location on the wheel 24 of a lowest average rim runout of the wheel 24, sometimes referred to as a "lo" mark. The average rim runout of the wheel 24 is an average of an inboard rim runout and an outboard rim runout. The inboard rim runout is the runout or variation of an inboard rim of the wheel from the central axis of the wheel 24. The outboard rim runout is the runout or variation of an outboard rim of the wheel from the central axis of the wheel 24. The amplitude for the lo mark, i.e., the lowest value of the rim runout of the wheel 24, is also generally available from the wheel 24 manufacturer. In the event that the wheel 24 is not marked with the lo mark and/or the amplitude of the lo mark is not known, then the location of the lo mark and the amplitude of the lo mark may be obtained and/or sensed in a suitable manner, and the lo mark placed on the wheel 24. With the lo mark on the wheel 24, and identifiable in the captured plan view image of the tire/wheel assembly 20, the angular position of the lo mark relative to the first angular location 42 may be determined, and defined as the third angular location 48. The amplitude of the third angular location 48 may be defined as the amplitude of the lo mark, i.e., the amplitude of the lowest average rim runout of the wheel 24. While the process is described herein using the lo mark to identify or locate the third angular location 48 and the third amplitude, it should be appreciated that the third angular location 48 and the third amplitude may be located and determined in some other manner not shown or described herein.

As noted above, the third angular location 48 is the angular location of the wheel runout factor 50 of the wheel 24 of the tire/wheel assembly 20, indicating a phase of the selected harmonic order of the wheel runout factor 50. The wheel runout factor 50 may include, but is not limited to, at least one of the inboard rim runout, the outboard rim runout, an average of the inboard rim runout and the outboard rim runout, or a transformed combination of the inboard rim runout and the outboard rim runout. In one embodiment, the wheel runout factor 50 is the average of the inboard rim runout of the wheel 24 and the outboard rim runout of the wheel 24. In another embodiment, the wheel runout factor 50 is defined as the inboard rim runout of the wheel 24. In yet another embodiment, the wheel runout factor 50 may be defined as the outboard rim runout of the wheel 24. In yet another embodiment the wheel runout factor 50 is the transformed combination of the inboard rim runout and the outboard rim runout. In one embodiment, the transformed combination of the inboard rim runout and the outboard rim runout may be considered, a weighted average, in which a weighting factor is applied to one of the inboard rim runout or the outboard rim runout to weight the average. In another embodiment, a transfer function coefficient is calculated and applied to each of the inboard rim runout and the outboard rim runout to define the transformed combination of the inboard rim runout and the outboard rim runout.

The first angular location 42 and the first amplitude may be combined to define a tire/wheel assembly phasor 66. As used herein, a "phasor" is a complex value that includes amplitude and phase dependence. Accordingly, the tire/wheel assembly phasor 66 includes the first angular location 42 of the selected harmonic order of the variation of the radial force 43 of the tire/wheel assembly 20, and the first amplitude of the selected harmonic order of the variation of the radial force 43 of the tire/wheel assembly 20. The second angular location 44 and the second amplitude are combined to define a tire phasor. The tire phasor includes the second angular location 44 of the tire 22 indicating the phase of the selected harmonic order of the variation of the radial force 46 of the tire 22, and the second amplitude of the selected harmonic order of the variation of the radial force 46 of the tire 22. Similarly, the third angular location 48 and the third amplitude may be combined to define a wheel phasor. The wheel phasor includes the third angular location 48 of the wheel 24 indicating the phase of the selected harmonic order of the wheel runout factor 50 (i.e., at least one of the inboard rim runout, the outboard rim runout, an average of the inboard rim runout and the outboard rim runout, or the transformed combination of the inboard rim runout and the outboard rim runout), and the third amplitude of the selected harmonic order of the wheel runout factor 50. The step of defining the tire/wheel assembly phasor 66, the tire phasor, and the wheel phasor, is generally indicated by box 110 in FIG. 3.

A tire transfer function coefficient is applied to the tire phasor to define a tire force metric 62. Applying the tire transfer function coefficient to the tire phasor may include multiplying the tire phasor by the tire transfer function coefficient to define the tire force metric 62. The tire force metric 62 is a measure of the amount of the variation of the radial force 43 of the tire/wheel assembly 20 that is attributable to the variation of the radial force 46 of the tire 22. A wheel transfer function coefficient is applied to the wheel phasor to define the wheel force metric 60. Applying the wheel transfer function coefficient to the wheel phasor may include multiplying the wheel phasor by the wheel transfer function coefficient to define the wheel force metric 60. The wheel force metric 60 is a measure of the amount of variation of the radial force 43 of the tire/wheel assembly 20 that is attributable to the wheel runout factor 50 of the wheel 24. The step of calculating the tire force metric 62 and the wheel force metric 60 is generally indicated by box 112 in FIG. 3.

The tire transfer function coefficient and the wheel transfer function coefficient may be calculated by a transfer function analysis using multiple inputs and a single output model, such as described in the textbook "Random Data Analysis and Measurement Procedures", 3$^{rd}$ Edition, Chapter 7: Multiple-Input/Output Relationships, pp 218-271, especially section 7.5.2 Multiple-Input/Single-Output Model (Matric Methods), ISBN 0-471-31733-0, Wiley-Interscience Publication, John Wiley & Sons, Inc., date: 2000, by Julius S. Bendat and Alan G. Piersol.

In order to accurately calculate the tire transfer function coefficient and the wheel transfer function coefficient, multiple tire/wheel assemblies 20 may be selected. The tire transfer function coefficient and the wheel transfer function coefficient may then be calculated from an aggregated combination of the tire/wheel assembly phasors 66, the tire phasors, and the wheel phasors of the plurality of tire/wheel assemblies 20. Accordingly, the tire/wheel assembly phasor 66, the tire phasor, and the wheel phasor for each of the plurality of different tire/wheel assemblies 20 is defined to provide a data set, in which each of the plurality of tire/wheel assemblies 20 provides a respective tire/wheel assembly phasor 66, a respective tire phasor, and a respective wheel phasor. The tire transfer function coefficient and the wheel transfer function coefficient are calculated using the data set of the plurality of tire/wheel assemblies 20 with the transfer function analysis using multiple inputs and a single output model.

Once the tire force metric 62 and the wheel force metric 60 have been calculated, at least one of a remaining force metric 68, or a sum 64 of the tire force metric 62 and the wheel force metric 60, may be calculated. The sum 64 of the tire force metric 62 and the wheel force metric 60, and the remaining force metric 68, are calculated using at least two of the following list of pairs, including a first pair including the first amplitude and the first angular location 42, a second pair including the second amplitude and the second angular location 44, and a third pair including the third amplitude and the third angular location 48.

Figure 4:
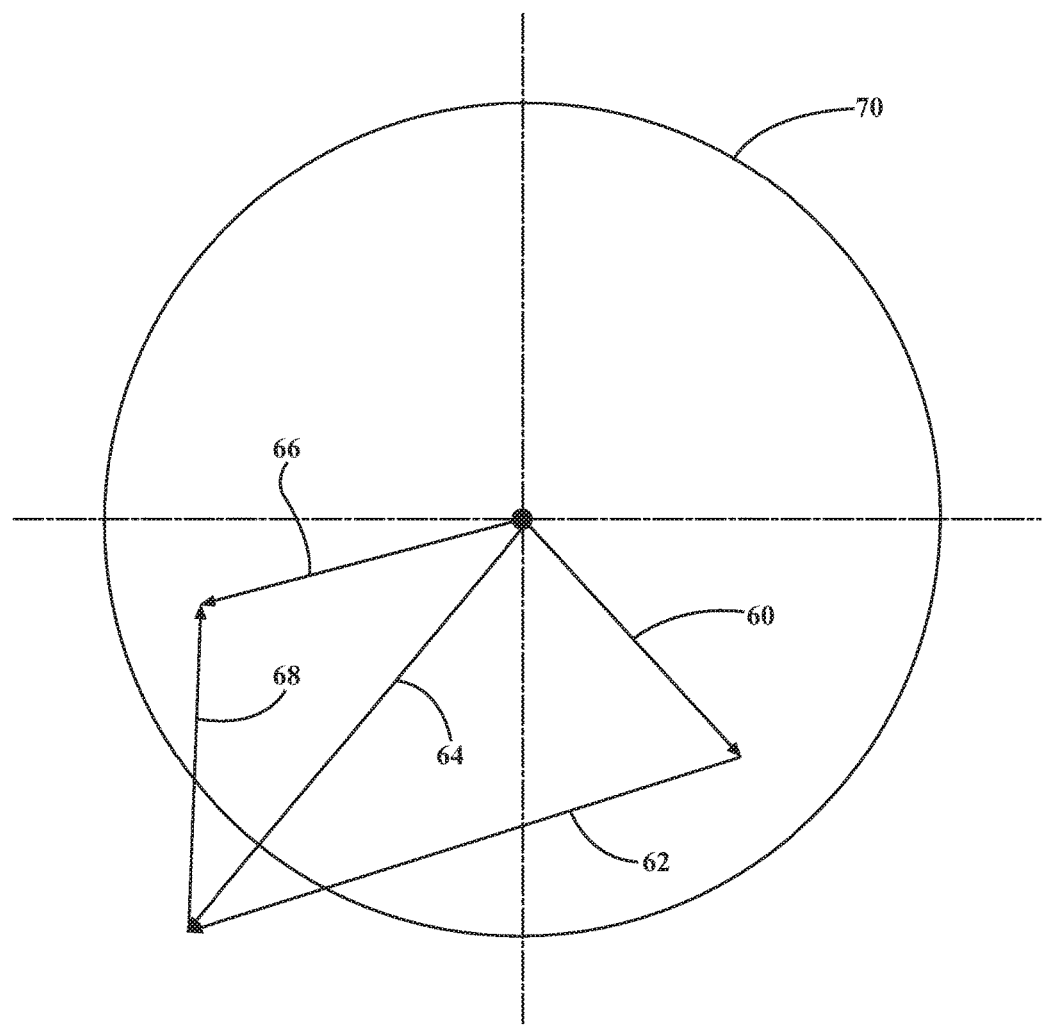
FIG. 4 is a complex plane diagram showing a tire/wheel phasor, wheel force metric, a tire force metric, a sum of the wheel force metric and the tire force metric, and a remaining force metric.

Referring to FIG. 4, the wheel force metric is shown at 60, and the tire force metric is shown at 62. The sum 64 of the tire force metric 62 and the wheel force metric 60 may be calculated to define a combined wheel 24 and tire 22 force metric 64. The step of calculating the sum 64 of the tire force metric 62 and the wheel force metric 60 is generally indicated by box 114 in FIG. 3. The tire force metric 62 and the wheel force metric 60 may be summed using vector addition, such as shown in the complex plane 70 of FIG. 4. The remaining force metric 68 is calculated by taking the difference between the tire/wheel assembly phasor 66 and the combined wheel 24 and tire 22 force metric 64, i.e., the sum 64 of the tire force metric 62 and the wheel force metric 60. The step of calculating the remaining force metric 68 is generally indicated by box 116 in FIG. 3. The remaining force metric 68 includes an amplitude and a phase angle of the selected harmonic order of a portion of the tire/wheel assembly phasor 66 that is not attributable to the tire force metric 62 and the wheel force metric 60. The difference between the tire/wheel assembly phasor 66 and the combined wheel 24 and tire 22 force metric 64 may be calculated using vector subtraction, such as shown in the complex plane 70 of FIG. 4. The combined wheel 24 and tire 22 force metric 64, the remaining force metric 68, and the tire/wheel assembly phasor 66 may be analyzed to identify or quantify different variables in the mounting of the tire 22 onto the wheel 24 that contribute to the variation of the radial force 43 of the tire/wheel assembly 20.

As described above, the wheel runout factor 50 may include at least one of the inboard rim runout value, the outboard rim runout value, the average of the inboard rim runout value and the outboard rim runout value, or the transformed combination of the inboard rim runout value and the outboard rim runout value. If more detailed analysis is desired, the wheel runout factor 50 may be defined by a plurality of sub-factors.

The plurality of sub-factors of the wheel runout factor 50 may include, but are not limited to, at least two of the inboard rim runout, the outboard rim runout, the average of the inboard rim runout and the outboard rim runout, and the transformed combination of the inboard rim runout and the outboard rim runout. For example, the plurality of sub-factors of the wheel runout factor 50 may include the inboard rim runout and the outboard rim runout.

Each respective one of the sub-factors indicates a phase of the selected harmonic order of the respective one of the sub-factors, and has a respective amplitude. A sub-factor phasor is defined for each respective one of the sub-factors of the wheel runout factor 50. Each respective sub-factor phasor includes an angular location of the selected harmonic order of the respective sub-factor, and an amplitude of the selected harmonic order of the respective sub-factor. A sub-factor transfer coefficient is calculated for each respective one of the sub-factors of the wheel runout factor 50. The respective sub-factor transfer coefficients may be calculated in the same manner described above, i.e., by the transfer function analysis using multiple inputs and a single output model, described above. The respective sub-factor transfer coefficient is applied to its respective sub-factor phasor, to define a respective sub-factor force metric for each respective one of the plurality of sub-factor phasors. The plurality of sub-factor force metrics may then be summed using vector addition to calculate the resultant wheel runout factor 50.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of controlling a variation of a radial force of a tire and wheel assembly, including a tire mounted on a wheel for use in a vehicle, the method comprising:
   selecting a harmonic order of the assembly;
   measuring a first amplitude of the selected harmonic order of the variation of the radial force of the tire and wheel assembly, with a radial force variation machine;
   locating a first angular location of the selected harmonic order of the variation of the radial force of the tire and wheel assembly, with the radial force variation machine;
   locating a second angular location, wherein the second angular location is an angular location of a tire of the tire and wheel assembly indicating a phase of the selected harmonic order of a radial force variation of the tire having a second amplitude of the selected harmonic order;
   locating a third angular location, wherein the third angular location is an angular location of a wheel runout factor of the tire and wheel assembly indicating a phase of the selected harmonic order of the wheel runout factor, having a third amplitude of the selected harmonic order;
   calculating at least one of a sum of a tire force metric and a wheel force metric, or a remaining force metric, wherein the sum of the tire force metric and the wheel force metric, and the remaining force metric, are calculated using at least two of the pairs of the first amplitude and the first angular location, the second amplitude and the second angular location, and the third amplitude and the third angular location;
   analyzing the sum of the tire force metric and the wheel force metric, and the remaining force metric, to identify at least one variable contributing to the variation of the radial force of the tire and wheel assembly; and
   mounting a tire similar to the tire of the tire and wheel assembly on a wheel similar to the wheel of the tire and wheel assembly in an orientation relative to each other based on the identified at least one variable to reduce radial force variation.

2. The method set forth in claim 1, further comprising:
   combining the first angular location and the first amplitude to define a tire and wheel assembly phasor;
   combining the second angular location and the second amplitude to define a tire phasor; and
   combining the third angular location and the third amplitude to define a wheel phasor.

3. The method set forth in claim 2, further comprising selecting a plurality of tire and wheel assemblies and calculating a tire transfer function coefficient and a wheel transfer function coefficient from an aggregated combination of the tire and wheel assembly phasors, the tire phasors, and the wheel phasors of the plurality of tire and wheel assemblies.

4. The method set forth in claim 3, wherein calculating the tire transfer function coefficient and the wheel transfer function coefficient is further defined as calculating the tire transfer function coefficient and the wheel transfer function coefficient with a transfer function analysis using multiple inputs and a single output model.

5. The method set forth in claim 2, further comprising:
   applying a tire transfer function coefficient to the tire phasor to define the tire force metric; and
   applying a wheel transfer function coefficient to the wheel phasor to define the wheel force metric.

6. The method set forth in claim 5, wherein calculating the remaining force metric includes calculating a difference between the tire and wheel assembly phasor and the sum of the tire force metric and the wheel force metric, wherein the remaining force metric includes an amplitude and a phase angle of the selected harmonic order of a portion of the tire and wheel assembly phasor that is not attributable to the tire force metric and the wheel force metric.

7. The method set forth in claim 1, wherein the selected harmonic order of the assembly is a first harmonic order of the tire and wheel assembly.

8. The method set forth in claim 1, further comprising mounting the tire on the wheel to form the tire and wheel assembly, wherein the tire and the wheel are randomly mounted.

9. The method set forth in claim 1, further comprising mounting the tire on the wheel to form the tire and wheel assembly, wherein the tire and the wheel are match mounted in a specific positional relationship relative to each.

10. The method set forth in claim 1, further comprising creating a plan view image of the tire and wheel assembly with the radial force variation machine, such that the second angular location, and the third angular location are identifiable in the plan view image.

11. The method set forth in claim 10, wherein creating the plan view image of the tire and wheel assembly with the radial force variation machine is further defined as creating the plan view image of the tire and wheel assembly with the radial force variation machine when the location of at least one of the first angular location, the second angular location, or the third angular location, is angularly aligned with a reference.

12. The method set forth in claim 1, wherein the wheel runout factor includes at least one of an inboard rim runout, an outboard rim runout, an average of the inboard rim runout and the outboard rim runout, or a transformed combination of the inboard rim runout and the outboard rim runout.

13. The method set forth in claim 5, wherein:
the wheel runout factor includes a plurality of sub-factors, with each respective one of the plurality of sub-factors indicating a phase of the selected harmonic order of the respective one of the sub-factors, and having a respective amplitude;
the wheel phasor includes a sub-factor phasor for each respective one of the plurality of sub-factors of the wheel runout factor, with each of the respective sub-factor phasors having an angular location of the selected harmonic order of the respective sub-factor, and an amplitude of the selected harmonic order of the respective sub-factor;
the wheel transfer function coefficient includes a sub-factor transfer coefficient for each respective one of the plurality of sub-factor phasors of the wheel phasor;
the wheel force metric includes a sub-factor force metric for each respective one of the plurality of sub-factor phasors; and
the plurality of sub-factors of the wheel runout factor includes at least two of an inboard rim runout, an outboard rim runout, an average of the inboard rim runout and the outboard rim runout, and a transformed combination of the inboard rim runout and the outboard rim runout.

14. A method of controlling a radial force variation of a tire and wheel assembly including a tire mounted on a wheel, the method comprising:
A) defining a tire and wheel assembly phasor, wherein the tire and wheel assembly phasor includes a first angular location of a selected harmonic order of the variation of the radial force of the tire and wheel assembly, and has a first amplitude of the selected harmonic order of the variation of the radial force of the tire and wheel assembly;
B) defining a tire phasor, wherein the tire phasor includes a second angular location of a tire of the tire and wheel assembly indicating a phase of the selected harmonic order of a radial force variation of the tire, and has a second amplitude of the selected harmonic order of the radial force variation of the tire;
C) defining a wheel phasor, wherein the wheel phasor includes a third angular location of a wheel runout factor of the tire and wheel assembly indicating a phase of the selected harmonic order of the wheel runout factor, and has a third amplitude of the selected harmonic order of the wheel runout factor of the wheel;
multiplying a tire transfer function coefficient with the tire phasor to define a tire force metric;
multiplying a wheel transfer function coefficient with the wheel phasor to define a wheel force metric;
calculating a sum of the tire force metric and the wheel force metric to define a combined wheel and tire force metric;
calculating a difference between the tire and wheel assembly phasor and the combined wheel and tire force metric to define a remaining force metric, wherein the remaining force metric includes an amplitude and a phase angle of the selected harmonic order of a portion of the tire and wheel assembly phasor that is not attributable to the tire force metric and the wheel force metric;
analyzing the combined wheel and tire force metric and the remaining force metric, to identify at least one variable contributing to the variation of the radial force of the tire and wheel assembly; and
mounting a tire similar to the tire of the tire and wheel assembly on a wheel similar to the wheel of the tire and wheel assembly in an orientation relative to each other based on the identified at least one variable to reduce radial force variation.

15. The method set forth in claim 14, further comprising:
repeating A, B, and C for a plurality of different tire and wheel assemblies to provide a data set in which each of the plurality of tire and wheel assemblies provides a respective tire and wheel assembly phasor, a respective tire phasor, and a respective wheel phasor; and
calculating the tire transfer function coefficient and the wheel transfer function coefficient from an aggregated combination of the tire and wheel assembly phasors, the tire phasors, and the wheel phasors of the plurality of tire and wheel assemblies with a transfer function analysis using multiple inputs and a single output model.

16. The method set forth in claim 14, wherein the wheel runout factor includes at least one of an inboard rim runout, an outboard rim runout, an average of the inboard rim runout and the outboard rim runout, or a transformed combination of the inboard rim runout and the outboard rim runout.

17. The method set forth in claim 14, wherein:
the wheel runout factor includes a plurality of sub-factors, with each respective one of the plurality of sub-factors indicating a phase of the selected harmonic order of the respective one of the sub-factors, and having a respective amplitude;
the wheel phasor includes a sub-factor phasor for each respective one of the plurality of sub-factors of the wheel runout factor, with each of the respective sub-factor phasors having an angular location of the selected harmonic order of the respective sub-factor, and an amplitude of the selected harmonic order of the respective sub-factor;
the wheel transfer function coefficient includes a sub-factor transfer coefficient for each respective one of the plurality of sub-factor phasors of the wheel phasor;
the wheel force metric includes a sub-factor force metric for each respective one of the plurality of sub-factors of the wheel runout factor; and
the plurality of sub-factors of the wheel runout factor includes at least two of an inboard rim runout, an outboard rim runout, an average of the inboard rim runout and the outboard rim runout, and a transformed combination of the inboard rim runout and the outboard rim runout.

18. A radial force variation machine for measuring a radial force variation in a tire and wheel assembly, the radial force variation machine comprising:
a spinner rotatable about a rotation axis and configured for supporting the tire and wheel assembly;
a load impressing mechanism operable to contact and load the tire and wheel assembly to a fixed separation between the rotation axis and the load impressing mechanism;
a radial force sensor positioned relative to the spinner and the load impressing mechanism, wherein the radial force sensor is operable to sense a change in amplitude of a radial force of the tire and wheel assembly for each revolution of the tire and wheel assembly as the tire and wheel assembly rotates about the rotation axis;

a locating system operable to identify an angular location on the tire and wheel assembly of a phase of a selected harmonic order of the radial force of the tire and wheel assembly, an angular location on the tire and wheel assembly of a phase of the selected harmonic order of a radial force of a tire of the tire and wheel assembly, and an angular location on the tire and wheel assembly of a phase of the selected harmonic order of a wheel runout factor of a wheel of the tire and wheel assembly.

19. The radial force variation machine set forth in claim 18, wherein the locating system includes a camera positioned to capture a plan view image of the tire and wheel assembly, such that the angular location on the tire and wheel assembly of the phase of the selected harmonic order of the radial force of the tire and the angular location on the tire and wheel assembly of the phase of the selected harmonic order of the wheel runout factor of the wheel are identifiable in the plan view image.

20. The radial force variation machine set forth in claim 19, wherein the camera is synchronized with the radial force sensor to capture the plan view image of the tire and wheel assembly thereby creating a normative axis basis for the relative angular locations of the angular location on the tire and wheel assembly of the phase of the selected harmonic order of the radial force of the tire and the angular location on the tire and wheel assembly of the phase of the selected harmonic order of the wheel runout factor of the wheel.

* * * * *